(No Model.)

C. M. CONRADSON.
ROLLER SKATE.

No. 317,514. Patented May 12, 1885.

WITNESSES:

INVENTOR
Conrad M. Conradson
By
ATTORNEYS

UNITED STATES PATENT OFFICE.

CONRAD M. CONRADSON, OF MADISON, ILLINOIS, ASSIGNOR OF ONE-THIRD TO FREDERICK A. JOHNSON, OF SAME PLACE.

ROLLER-SKATE.

SPECIFICATION forming part of Letters Patent No. 317,514, dated May 12, 1885.

Application filed January 5, 1885. (No model.)

*To all whom it may concern:*

Be it known that I, CONRAD M. CONRADSON, a citizen of the United States, and residing at Madison, in the county of Dane and State of Wisconsin, have invented certain new and useful Improvements in Roller-Skates, which are fully set forth in the following specification, reference being had to the accompanying drawings, in which—

Figure 2:
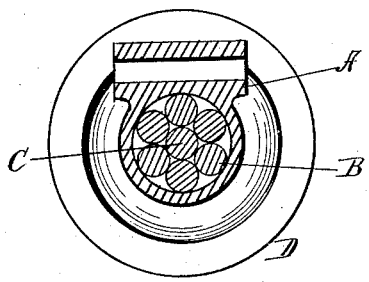
Figure 1:
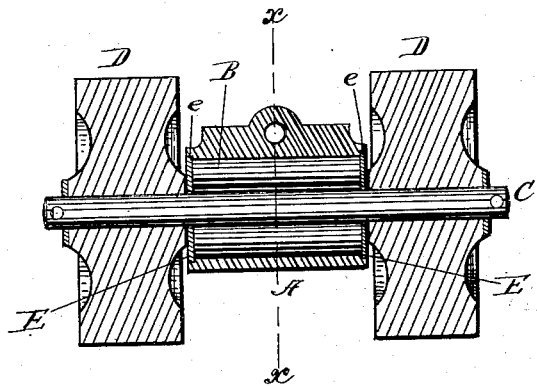
Figure 3:
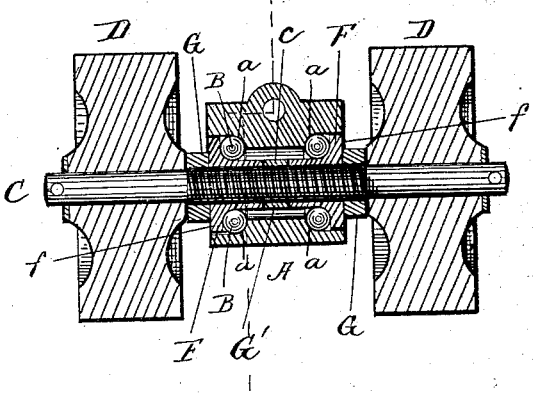

Figure 1 is a transverse sectional view of a device embodying my invention; Fig. 2, a sectional view of the same on the line $x\,x$ of Fig. 1; Fig. 3, a sectional view, similar to Fig. 1, of a modified form of my invention; and Fig. 4, a sectional view on the line $y\,y$ of Fig. 3.

Like letters refer to like parts in all the figures of the drawings.

My invention relates to roller-skates, and more particularly to the manner of attaching or mounting the rollers, its object being to provide an axle-bearing that will operate with less friction than the ordinary bearing, be more cleanly in use, and require a minimum of lubrication; and to these ends my invention consists in certain novel features which I will now proceed to describe, and then specifically point out in the claims.

The axles for roller-skates as at present constructed must, in order to obtain the best results, be frequently and freely oiled, and even under the most favorable conditions the friction is excessive, owing to the great weight of the load on the bearing in proportion to the size of the axle. Moreover, this oil exudes at the ends of the bearing and collects dust and dirt from the skating-floor, which is thrown from the rollers, by the centrifugal force due to its rapid rotation, upon the clothing of the skater and upon the floor. The former of these objections is by far the more serious of the two, since it greatly increases the labor of skating and calls for a great amount of muscular exertion.

In the drawings I have shown in Figs. 1 and 2 one form of my invention, in which A indicates the bearing in which the axle is mounted, said bearing being attached to the skate, or, more properly speaking, to the bracket thereon, in any approved manner, the connection between the skate and the bracket being such that the bearing may be applied to any skate.

Within the bearing A are arranged a series of anti-friction rollers, B, of suitable material, the said rollers surrounding the axle C and accurately filling the space between the axle and the walls of the bearing, these several parts being accurately turned to the proper size.

On the projecting ends of the axle C are mounted the rollers D, these rollers being loose upon the axle, so that they may turn thereon independently of each other, in order that they may have a differential movement when traveling upon a curve, to prevent dragging. The rollers D are retained in position on the axle by means of pins or cotters passing through the ends of the axle, which project beyond the rollers.

On the axle C, between the rollers D and the bearing A, are arranged washers E, which bear against the end of the recess in the bearing and serve to close the same, thereby forming an oil-chamber for retaining the oil within the bearing, and also for preventing lateral slipping of the anti-friction rollers B, while at the same time they form an abutment for the inner faces of the rollers D, which bear against them and hold them in place.

If desired, the bearing A may be recessed at each end, as shown at $e$, to receive the washers E, in order to form a more closely-fitting connection between the two.

Figure 4:
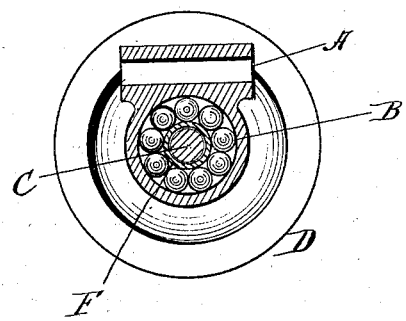

In Figs. 3 and 4 of the drawings I have shown a modified form of my invention, in which anti-friction balls or spheres are employed instead of the rollers shown in Figs. 1 and 2. In this case the bearing A will be provided with suitable surfaces, $a$, against which the balls B' may bear, while the axle C will be provided with similar surfaces for the same purpose, these surfaces being shown, in the present instance, as furnished by means of sleeves F attached to the axle, these sleeves being internally threaded to screw upon the threaded central portion, $c$, of the axle C. The outer ends of these sleeves F are formed into disks $f$, which serve to close the recesses in the bearing A in the same manner and for the same purposes as do the washers E in the construction shown in Figs. 1 and 2 of the drawings. Check-nuts G are interposed between the sleeves F and the rollers B, and a similar check-nut, G', may be interposed between the adjacent inner ends of the sleeves.

It is obvious that by rotating the sleeves F they may be brought closer together, and, consequently, with their bearing-surfaces near to the bearing-surfaces $a$ of the bearing A, in order to take up any wear that may occur.

The operation of my improved device is obvious. By means of the anti-friction rollers or balls the friction is reduced to a minimum, while at the same time but very little lubrication is necessary, and by means of the washers E, or their equivalents—the disks $f$ on the outer end of the sleeves F—the oil will be prevented from escaping from the axle-bearing, thereby preventing waste of the lubricant and rendering the skate more cleanly in use. By reason of the rollers D being mounted loosely on the axle C they are capable of independent motion with respect to each other and with respect to the rotation of the axle, thereby preventing any increase in the frictional resistance or any strain on the axle when the rollers are moving in a curved path, in which one roller must travel over a greater distance than the other.

It is obvious that many mechanical modifications in the details of construction may be made without departing from the principle of my invention, and I therefore do not wish to be understood as limiting myself strictly to the precise details of construction hereinbefore set forth and shown in the drawings.

Having thus described my invention, what I claim as new, and desire to secure by Letters Patent, is—

1. In a roller-skate, the combination, with the rollers and their axle, of the bearing containing anti-friction rollers or balls arranged between the walls of the bearing and the axle, and disks or washers arranged between the rollers and the ends of the said bearing, substantially as and for the purposes specified.

2. In a roller skate, the combination, with the rollers D and their axles C, of the bearing A, containing anti-friction rollers or balls surrounding the said axle, and disks or washers arranged between the rollers and the ends of the bearing A to close the ends of the said bearing and form an abutment for the rollers, substantially as and for the purposes specified.

CONRAD M. CONRADSON.

Witnesses:
W. R. BAGLEY,
J. A. JOHNSON.